(12) United States Patent
Kretschmann et al.

(10) Patent No.: US 9,701,287 B2
(45) Date of Patent: Jul. 11, 2017

(54) DEVICE AND METHOD FOR DETERMINING AN ABSOLUTE ANGULAR POSITION OF A WHEEL OF A VEHICLE

(71) Applicant: CONTINENTAL AUTOMOTIVE GMBH, Hannover (DE)

(72) Inventors: Matthias Kretschmann, Regensburg (DE); Holger Faisst, Sinzing (DE); Takeaki Yajima, Tokyo (JP)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/385,550

(22) PCT Filed: Mar. 11, 2013

(86) PCT No.: PCT/EP2013/054877
§ 371 (c)(1),
(2) Date: Sep. 16, 2014

(87) PCT Pub. No.: WO2013/135628
PCT Pub. Date: Sep. 19, 2013

(65) Prior Publication Data
US 2015/0073677 A1    Mar. 12, 2015

(30) Foreign Application Priority Data
Mar. 16, 2012 (DE) .......... 10 2012 204 141

(51) Int. Cl.
*G01D 5/14*     (2006.01)
*G01P 3/488*    (2006.01)
*B60T 8/171*    (2006.01)

(52) U.S. Cl.
CPC .............. *B60T 8/171* (2013.01); *G01D 5/147* (2013.01); *G01P 3/488* (2013.01)

(58) Field of Classification Search
CPC ...... B60T 8/171; B60T 8/1755; B60T 8/1764; G01D 5/145; G01D 5/147
(Continued)

(56) References Cited

U.S. PATENT DOCUMENTS 5,041,979 A * 8/1991 Hirka .................... F02P 7/0775
701/102
5,682,095 A 10/1997 Mathes et al.
(Continued)

FOREIGN PATENT DOCUMENTS

CN    101052539 A    10/2007
CN    101183047 A    5/2008
(Continued)

*Primary Examiner* — Mussa A Shaawat
*Assistant Examiner* — Abdhesh Jha
(74) *Attorney, Agent, or Firm* — Laurence A. Greenberg; Werner H. Stemer; Ralph E. Locher

(57) ABSTRACT

A device and a method for determining an absolute angular position of a wheel of a vehicle. A wheel unit is mounted on the wheel side and configured to determine data which permit a reference limb of the wheel, and to wirelessly transmit the acquired data. A receiver unit is mounted on the vehicle side and receives the data of the wheel unit. A reference limb-determining device determines the reference limb of the wheel on the basis of the received data. A measuring device generates, in each case, one signal when the wheel rotates by a previously determined angle, and a counting device counts the signals generated by the measuring device. An angle-determining device determines an absolute angular position of the wheel on the basis of the signals counted by the counting device, and on the basis of the specific reference limb.

11 Claims, 4 Drawing Sheets

(58) Field of Classification Search
USPC ....... 701/70, 41, 42, 1, 72, 31.4, 36, 38, 43, 701/45, 82
See application file for complete search history.

(56) References Cited

U.S. PATENT DOCUMENTS

| | | |
|---|---|---|
| 6,112,587 A | 9/2000 | Oldenettel |
| 6,435,020 B1 | 8/2002 | Oldenettel et al. |
| 6,446,018 B1 | 9/2002 | Isermann et al. |
| 7,075,459 B1 | 7/2006 | Begin et al. |
| 7,336,161 B2 | 2/2008 | Walraet |
| 7,636,035 B2 | 12/2009 | Pretzlaff et al. |
| 7,756,671 B2 | 7/2010 | Bertrand |
| 8,332,104 B2 | 12/2012 | Greer et al. |
| 8,659,411 B2 | 2/2014 | Fink |
| 8,880,286 B2 | 11/2014 | Fink |
| 2011/0066397 A1 | 3/2011 | Kranz |
| 2012/0259507 A1 | 10/2012 | Fink |

FOREIGN PATENT DOCUMENTS

| | | |
|---|---|---|
| DE | 4141958 A1 | 6/1993 |
| DE | 19721488 A1 | 11/1998 |
| DE | 19734323 A1 | 2/1999 |
| DE | 10342297 A1 | 4/2005 |
| DE | 102004053696 A1 | 5/2006 |
| DE | 102008049046 A1 | 4/2010 |
| DE | 102009059788 A1 | 6/2011 |
| DE | 102009059789 A1 | 6/2011 |
| EP | 1052119 A1 | 11/2000 |
| EP | 1923669 A1 | 5/2008 |
| JP | 2008122400 A | 5/2008 |
| WO | 2009070065 A1 | 6/2009 |
| WO | 2011038033 A1 | 3/2011 |

\* cited by examiner

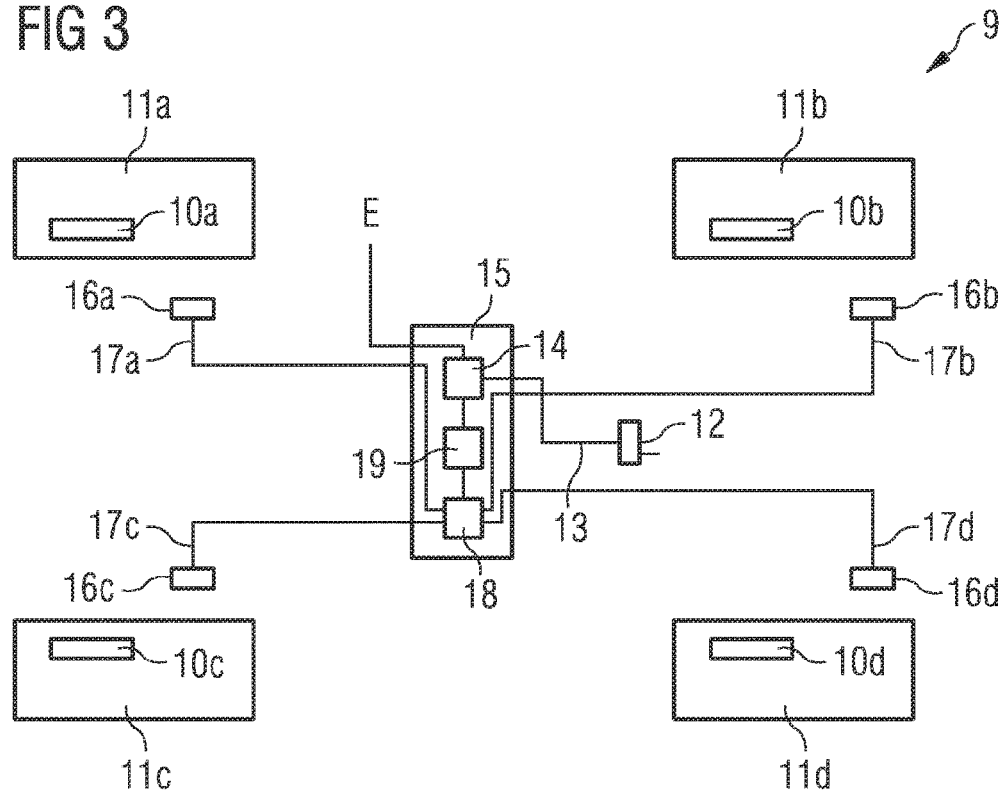
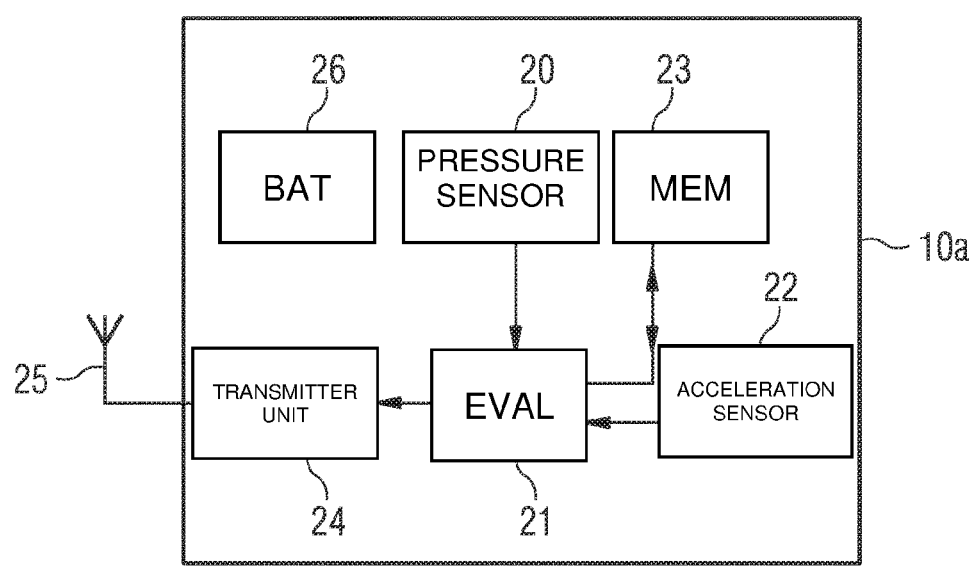

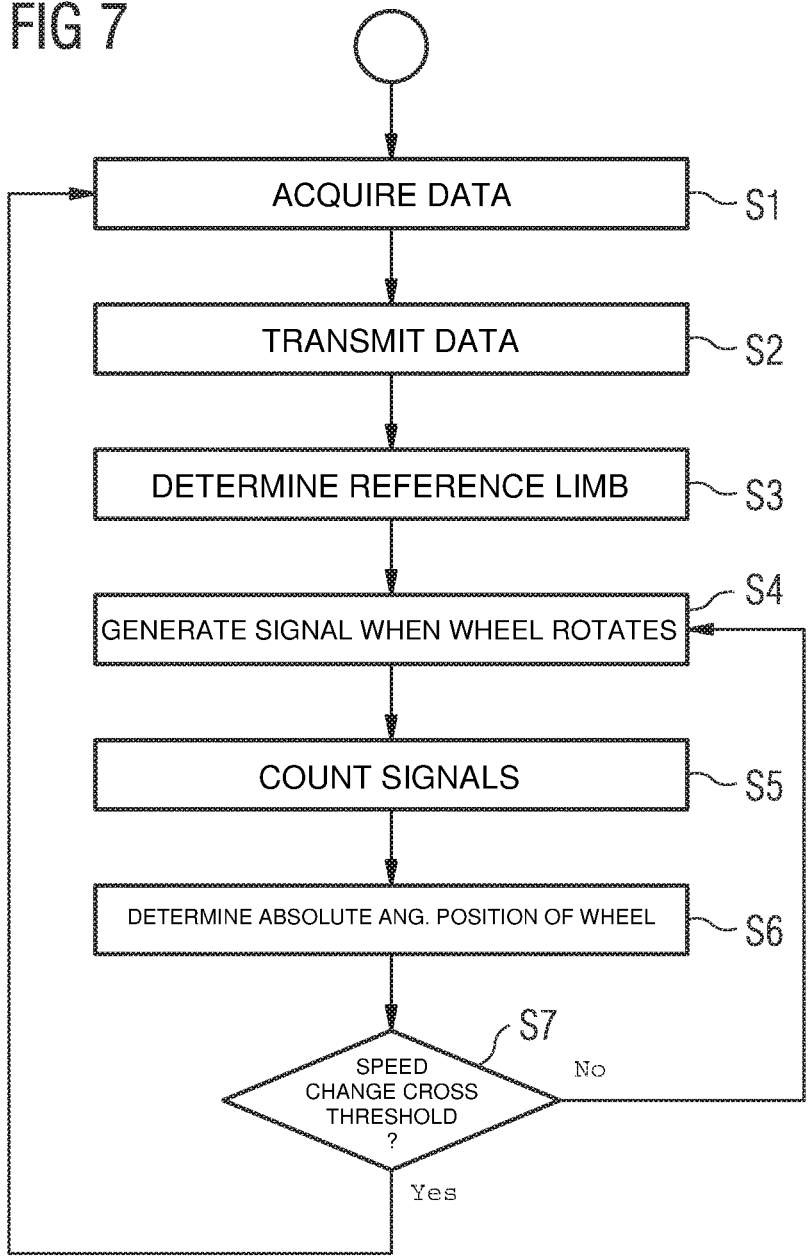

DEVICE AND METHOD FOR DETERMINING AN ABSOLUTE ANGULAR POSITION OF A WHEEL OF A VEHICLE

BACKGROUND OF THE INVENTION

Field of the Invention

The present invention relates to a device and a method for determining an absolute angular position of a wheel. Such a device comprises a measuring device for generating in each case a signal when the wheel rotates by a predetermined angle, and a counting device for counting the signals generated by the measuring device. Accordingly, the method generates in each case a signal when the wheel rotates by a predetermined angle and counts the generated signals.

Such measuring and counting devices are known from the prior art as rotational speed sensors which are used, for example, within the scope of an anti-lock brake system (ABS) or a traction controller. DE 41 41 958 A1 describes an example of such a rotational speed sensor. A gearwheel rotates in such a way that each of its teeth initially passes through a first Hall element and subsequently a second Hall element. The Hall elements output signals which permit any passing tooth to be detected and the number of the passing teeth to be correspondingly counted. On this basis, a rotational speed of a wheel of a vehicle which is connected to the gearwheel can be determined. However, it is problematic that an absolute angular position of the wheel cannot be acquired in this way.

DE 197 21 488 A1 mentions as a possibility for solving this problem that a tooth of the gearwheel could be omitted in order to be able to infer an absolute angular position of the gearwheel on the basis of an abnormality which arises as a result in the signal profile of the Hall elements. However, DE 197 21 488 A1 claims to manage without such marking and proposes that the current position of the gearwheel be determined without a reference pulse by means of correlation analysis. Such correlation analysis is, however, extremely slow because a large number of rotations are required until conclusions can be drawn about an absolute angular position of the gearwheel.

BRIEF SUMMARY OF THE INVENTION

Taking the prior art as a starting point, an object of the present invention is to specify a device and a corresponding method which permit rapid and reliable determination of an absolute angular position of a wheel of a vehicle.

According to the invention, this object is achieved by means of the subjects of the independent patent claims. The dependent patent claims specify embodiments of the invention.

Accordingly, the invention comprises a device for determining an absolute angular position of a wheel of a vehicle comprising a wheel unit which can be mounted on the wheel side and is configured to acquire data which permit a reference limb of the wheel to be determined and to transmit the acquired data in a wireless fashion. The device has a receiver unit which can be mounted on the vehicle side and has the purpose of receiving the data of the wheel unit. A reference limb-determining device can determine the reference limb on the basis of the received data. In addition, the device according to the invention comprises a measuring device for generating in each case a signal when the wheel rotates by a predetermined angle and a counting device for counting the signals generated by the measuring device. Such a measuring device can have, for example, a rotational element of an ABS sensor which rotates synchronously with the wheel. An angle-determining device can then determine an absolute angular position of the wheel on the basis of the signals counted by the counting device and the determined reference limb.

This device according to the invention permits not only the determination of an absolute angular position of a gearwheel but also the determination of an absolute angular position of a vehicle wheel. According to DE 197 21 488 A1, these two absolute angular positions are identical only if during the mounting of a vehicle wheel extreme care is taken to ensure how the vehicle wheel is mounted. At most, the attachment is carried out by means of five screws so that in each case a rotation of the vehicle wheel with respect to the gearwheel by 72° is possible. Since the wheel unit can be mounted directly on the wheel, the data made available by it are independent of a mounting position on the vehicle.

In one embodiment, the device is configured to receive or acquire data relating to a speed of the vehicle, and the reference limb-determining device is configured to determine the reference limb of the wheel if the speed changes from a value below a predetermined threshold value to a value above the threshold value.

This embodiment is advantageous because measuring and counting devices which are known from the prior art often supply incorrect values at low speeds. This is, on the one hand, associated with the fact that the signals of the Hall elements are sampled and pulses are often ignored if they do not occur completely in a predefined time interval. On the other hand, a voltage which is induced in the Hall element is often very low at a low rotational speed of the gearwheel and therefore can no longer be measured and evaluated. A further problem is that a vehicle can easily travel backward and in this case the signals generated by the measuring device have to be subtracted instead of added. It is therefore appropriate to determine the reference limb of the wheel anew whenever the speed of the vehicle changes from a value below a predetermined threshold value to a value above the threshold value. In this context, the threshold value should be selected such that at speeds above the threshold value signals are reliably generated and counted. The renewed determination of the reference limb ensures that the absolute angular position of the vehicle is determined correctly again.

The wheel unit can comprise an acceleration sensor and be configured to acquire the data on the basis of a gravity of the earth acting on the acceleration sensor, acceleration occurring when the acceleration sensor enters a footprint of the wheel, or acceleration occurring when the acceleration sensor exits the footprint of the wheel. In this context, the term acceleration sensor is also to be understood as a shock sensor within the sense of the present patent application.

When the wheel rotates, a centrifugal force acts on an acceleration sensor which is mounted on the rim or on the tire. Superimposed on this centrifugal force is the earth's gravity, on the basis of which an absolute angular position of the acceleration sensor and therefore the wheel can be determined. The footprint of the wheel is also referred to as a tire contact area. This tire contact area is essentially straight and not arcuate, like the rest of the wheel, with the result that a change in the acceleration occurs when the acceleration sensor enters and exits the footprint.

Additionally or alternatively, the wheel unit can comprise a piezo-element which is vulcanized, for example, into the tire or attached to the inside of the tire. The wheel unit can be configured to acquire the data on the basis of a change in bending of the piezo-element occurring when the piezo-element enters the footprint of the wheel, or a change in the bending of the piezo-element occurring when the piezo-element exits the footprint area of the wheel. A piezo-element is an extremely simple, cost-effective and robust element for making available required measured values.

In one embodiment, the wheel unit comprises a magnetic field sensor and is configured to acquire the data on the basis of a magnetic field of the earth acting on the magnetic field sensor. Such a magnetic field sensor is, in contrast to an acceleration sensor, independent of any acceleration processes and braking processes of the vehicle.

The wheel unit can comprise an evaluation unit which is configured to sample output signals of a sensor (such as, for example, of the acceleration sensor, of the piezo-element or of the magnetic field sensor) of the wheel unit in order to generate sampled signals and to analyze the sampled signals in order to detect passage of the wheel through the reference limb. Such an evaluation unit could sample, for example, the signal profile of the acceleration sensor, calculate therefrom the portion of the signal which is to be explained by the centrifugal force, with the result that essentially only the influence of the earth's gravitational field then remains, and determine the maximum and/or minimum values in the remaining signal profile in order thereby to detect the passage of the wheel through the reference limb. It is also possible to provide an event-controlled evaluation of the output signals of the sensor of the wheel unit. For example, the evaluation unit can be in sleep mode and be woken in each case by a voltage pulse of the piezo-element which occurs when the piezo-element enters or exits the footprint. Such an event-controlled evaluation, during which the evaluation unit is in sleep mode between the events, is particularly economical in terms of energy.

In one embodiment, the wheel unit is configured to transmit the data essentially at a time at which the wheel passes through the reference limb. On the vehicle side, it is then possible to use the reception time to infer when the wheel has passed through the reference limb. However, it can be problematic here that a connecting link between the wheel unit and the receiver unit is possibly particularly bad when as it were what is referred to as a "black spot" is present when the wheel unit passes through the reference limb.

In another embodiment, the wheel unit is configured to acquire the time at which the wheel passes through the reference limb and to transmit the acquired time within the scope of the data. This variant can determine relatively freely the transmission time at which the data are transmitted, with the result that transmission at a "black spot" can be avoided. However, the variant requires clock synchronization between the wheel unit and the vehicle side.

Furthermore, the present invention comprises a method for determining an absolute angular position of a wheel of a vehicle. In this method, a wheel unit which can be mounted on the wheel side acquires data which permit a reference limb of the wheel to be determined. The acquired data are transmitted in a wireless fashion from the wheel unit to a receiver unit which can be mounted on the vehicle side. The reference limb of the wheel is then determined on the basis of the transmitted data. When the wheel rotates by a predetermined angle, in each case a signal is generated and the generated signals are counted. On the basis of the counted generated signals and the determined reference limb, an absolute angular position of the wheel is determined.

In this context, data which permit the reference limb of the wheel to be determined are preferably acquired and transmitted, and a corresponding reference limb of the wheel is determined on the basis of these data when a speed of the vehicle changes from a value below a predetermined threshold value to a value above the threshold value.

The features of the invention have been described with reference to a device and/or with reference to a method. Unless explicitly stated otherwise, the device features can also be applied correspondingly to the method. The invention therefore provides corresponding steps for embodiments of the method in order to do what the device elements are configured for. Of course, the method according to the invention can therefore comprise the step of acquiring the data on the basis of a gravity of the earth acting on the acceleration sensor. Likewise, in one embodiment, the method according to the invention comprises the step of acquiring the data on the basis of a change in bending of the piezo-element occurring when the piezo-element enters a footprint (road contact area) of the wheel.

Further advantages and details of the present invention will be explained below with reference to the embodiments illustrated in the figures.

BRIEF DESCRIPTION OF THE SEVERAL
VIEWS OF THE DRAWING

In the drawings:

FIG. 3 shows an embodiment of a device according to the invention for determining an absolute angular position of a wheel;

FIG. 4 shows a wheel unit from FIG. 3 in detail;

FIG. 7 shows an embodiment of a method according to the invention for determining an absolute angular position of a wheel.

DESCRIPTION OF THE INVENTION

In the following description, identical and identically acting elements are, unless stated otherwise, specified with the same reference symbols.

Figure 1:
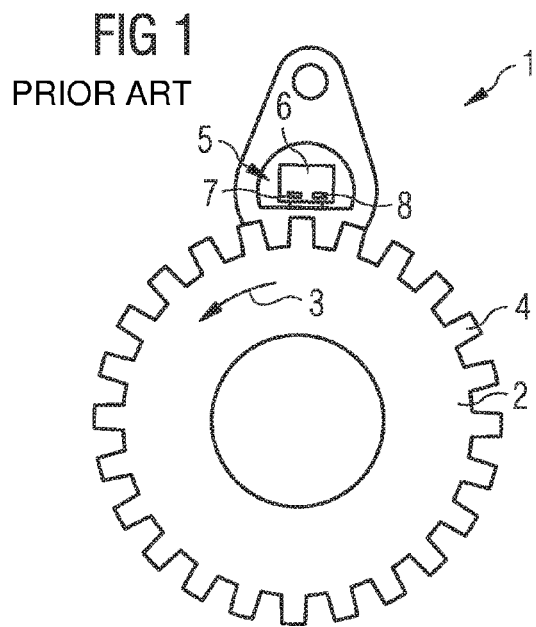
FIG. 1 shows a rotational speed sensor according to the prior art.

FIG. 1 illustrates the rotational speed sensor 1 described in DE 41 41 958 A1. A gearwheel 2 rotates synchronously with a vehicle wheel (not shown) in the direction of the arrow 3. In this context, the teeth 4 of the gearwheel 2 pass a Hall sensor 5. The Hall sensor 5 comprises a magnet 6 and two Hall elements 7, 8 which each generate a voltage pulse when a tooth 4 passes them. Since the gearwheel 2 has a total of 24 teeth, it is possible to assume that after 24 voltage pulses the gearwheel 2 has completed one complete rotation. Of course, a different number of teeth would also be conceivable. In the following formula, the number of voltage pulses which correspond to one complete rotation of the wheel is to be denoted by N. The voltage pulses are counted and the number of counted voltage pulses are denoted by M. I specifies an initial position of the gearwheel 2. The absolute angular position P of the gearwheel 2 can be determined by means of this parameter using the following equation:

$$P = \text{MOD}(M+I, N)/n * 360°$$

Figure 2:
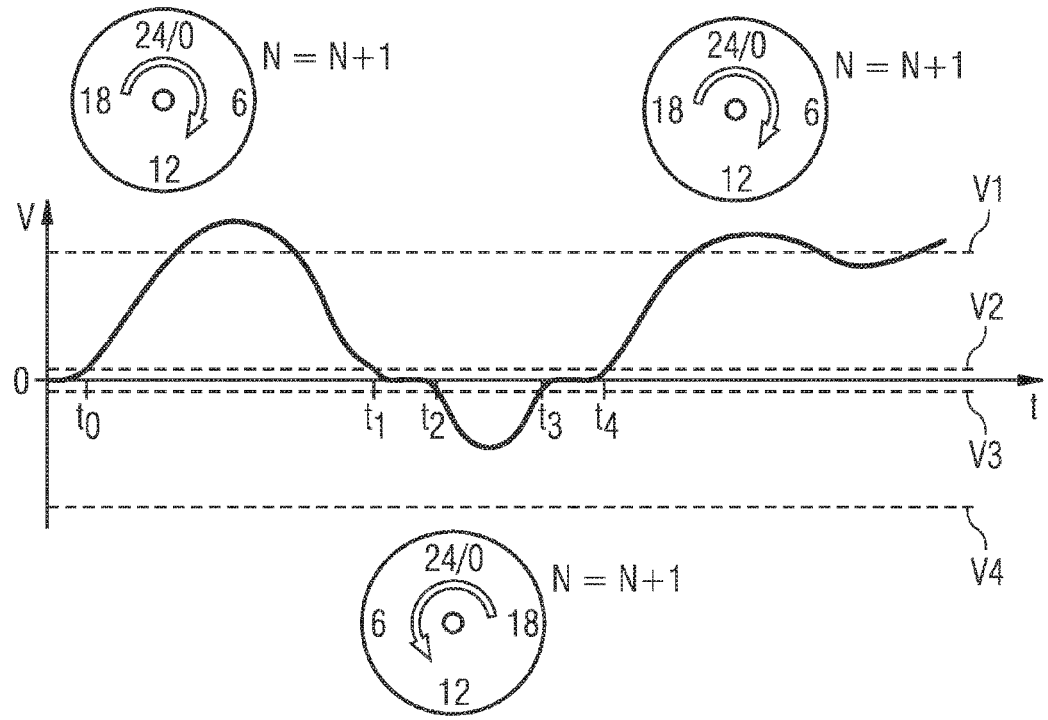
FIG. 2 shows a speed profile of a vehicle for explaining problems of the rotational speed sensor according to FIG. 1.

However, it is problematic with this formula that the initial position I is not known. Furthermore, certain driving situations constitute a problem for a reliable counting process of the voltage pulses. FIG. 2 shows the profile of a speed of a vehicle over time against the time in order to clarify these problems. In order to explain the phenomena which occur, four dashed speed lines V1 to V4 are shown. V1 corresponds to a speed of 25 km/h, V2 to a speed of 2 km/h, V3 to a speed of −2 km/h and V4 to a speed of −25 km/h, wherein a negative sign indicates travel in reverse. The arrows specified above and below the speed curve in circles clarify the rotational direction of the gearwheel 2. The formula N=N+1 next to the latter symbolizes that the voltage pulses are added. The circles contain no numbers which indicate that in the case of the reference limb the process starts at zero, six voltage pulses are counted after a rotation by 90°, twelve voltage pulses after a rotation by 180°, eighteen voltage pulses after a rotation by 270°, and twenty four voltage pulses after a rotation by 360°. Of course, these numbers change if the gearwheel has a number of teeth other than twenty four.

If the gearwheel 2 rotates extremely slowly, such as is the case, for example, with speeds between V2 and V3, the teeth 4 of the gearwheel 2 move slowly past the Hall sensor 5 such that the voltage induced by said teeth 4 is very low and correspondingly no voltage pulses can be detected.

Furthermore, the signal of the Hall sensor 5 is generally sampled and voltage pulses which occur in more than one time interval are, under certain circumstances, ignored. That is to say that the voltage pulses are probably not correctly summed until the time t0 of the rotational speed sensor 1. At the time t1, the speed of the vehicle drops back under the speed V2, as a result of which faults can occur during the counting. At the time t2, the vehicle moves in reverse. The speed would permit correct counting of the voltage pulses, but the customary rotational speed sensors are usually not configured to subtract the voltage pulses in the case of reverse travel but instead to continue with the addition. Therefore, incorrect counting occurs between the times t2 and t3 because the voltage pulses continue to be added instead of being subtracted. At the time t4, it would then again be possible to count correctly but the initial position I would have to be newly acquired in order to eliminate the incorrect counts carried out between the times t1 and t4.

FIG. 3 shows an embodiment of a device according to the invention for determining an absolute angular position of a wheel of a vehicle. The device 9 comprises four wheel units 10a, 10b, 10c, 10d, which are each configured to acquire data which permit a reference limb of the wheel to which the wheel units are assigned to be determined, and to transmit the acquired data in a wireless fashion. The four wheel units 10a, 10b, 10c, 10d are mounted on corresponding wheels 11a, 11b, 11c, 11d of the vehicle. A receiver unit 12 for receiving the data which are transmitted by the wheel units 10a to 10d is located on the vehicle side.

The receiver unit 12 passes on the received data to a reference limb-determining device 14 via a line 13. Said reference limb-determining device 14 is a component of the vehicle electronics 15. Furthermore, four measuring devices 16a, 16b, 16c, 16d are provided on the vehicle side in the vicinity of the wheels 11a to 11d, said measuring devices 16a, 16b, 16c, 16d generating in each case a signal when the wheel assigned to them rotates by a predetermined angle. Via corresponding lines 17a, 17b, 17c, 17d, the measuring devices transmit the signals generated by them to a central counting device 18 which counts the signals generated by the measuring devices 16a to 16d.

The vehicle electronics 15 receive from the outside an input signal E which contains data which provide conclusions about the speed of the vehicle. For example, a sensor, from whose data it is possible to infer the speed, can be arranged on an output side of the transmission. The input signal E is passed onto the reference limb-determining device 14 which determines the reference limb of the wheel when the speed changes from a value below a predetermined threshold value to a value above the threshold value. Alternatively, the reference limb-determining device 14 could also evaluate the data of the four measuring devices 16a, 16b, 16c, 16d in order to acquire the speed of the vehicle therefrom.

An angle-determining device 19 is connected to the reference limb-determining device 14 and to the counting device 18 and determines an absolute angular position of the wheels 11a to 11d on the basis of the signals counted by the counting device and the reference limbs, determined by the reference limb-determining device, of each wheel.

FIG. 4 illustrates once more in detail one of the wheel units 10a shown in FIG. 3. The vehicle unit 10a belongs here to a tire pressure-monitoring system and therefore has a pressure sensor 20. The latter transmits its data to an evaluation unit 21. Furthermore, the wheel unit comprises an acceleration sensor 22 which also transmits its data to the evaluation unit 21. The evaluation unit 21 is in contact with a memory 23 and can transmit its data to the vehicle-side receiver unit 12 via a transmitter unit 24 and a corresponding antenna 25. A battery 26 supplies the wheel unit 10a with the required energy.

Figure 5:
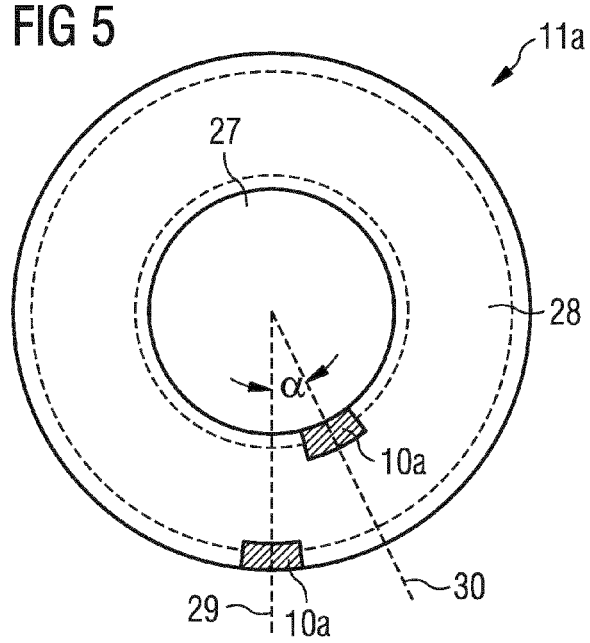
FIG. 5 shows two possible mounting positions for a wheel unit.

FIG. 5 illustrates once more the wheel 11a which is shown in FIG. 3, in order to clarify two conceivable arrangement points of the wheel unit 10a on this wheel. The wheel 11a comprises a rim 27 and a tire 28 which is fitted onto the rim 27. The wheel unit 10a can be arranged, for example, on the rim, for example by means of a steel band, which extends around the rim, or it can be bonded onto the inside of the tire 28 or vulcanized into the tire. Furthermore, the wheel unit can easily be arranged on the valve. In addition, in FIG. 5 a possible reference limb 29 is shown. The limb 30 on which the wheel unit arranged on the rim is located is located at an angle α with respect to this reference limb.

Figure 6:
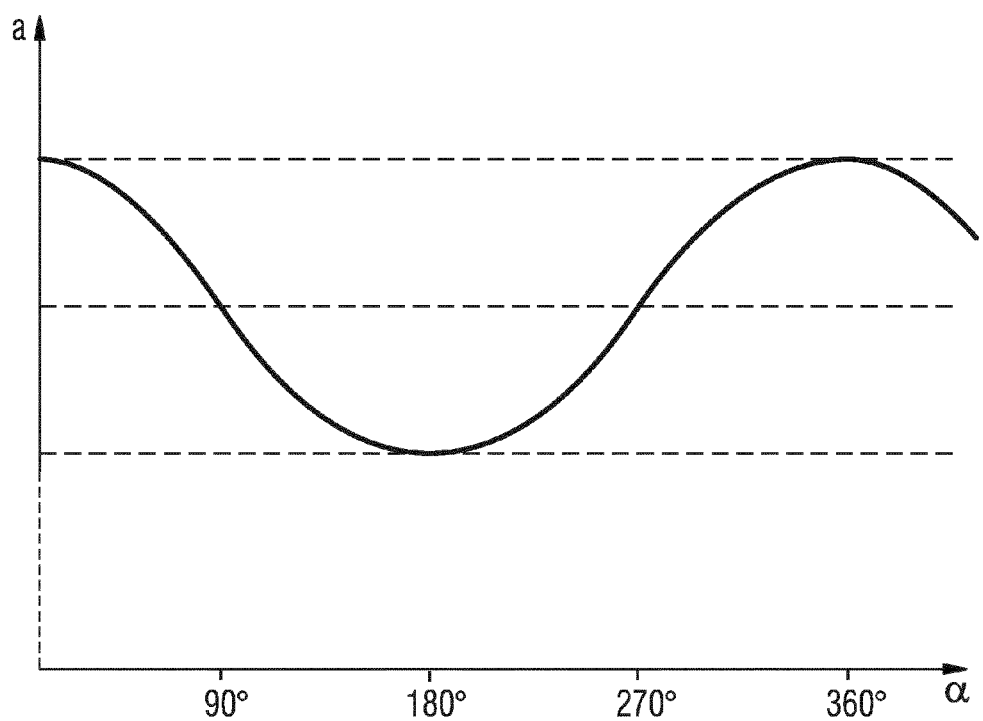
FIG. 6 shows a signal profile of an acceleration sensor.

FIG. 6 shows the acceleration which acts on the acceleration sensor when the wheel rotates. The angle α is entered on the abscissa, and the acceleration on the ordinate. The acceleration is composed essentially of a component which originates from the centrifugal force, and a further component which is caused by the earth's gravity. If the acceleration sensor is on the reference limb 29, the centrifugal force and the earth's gravity act precisely in the same direction, with the result that the acceleration assumes its maximum value. In the case of an angle of 180°, the earth's gravity counteracts the centrifugal force with the result that the minimum acceleration occurs here. On the basis of the acceleration forces which act on the acceleration sensor it is therefore possible to determine when the wheel unit 10a will pass through the reference limb 29.

FIG. 7 shows an embodiment of a method according to the invention for determining an absolute angular position of a wheel of a vehicle. In step S1, data which permit a reference limb of the wheel to be determined are acquired by means of the wheel unit which can be mounted on the wheel side. These data are transmitted in a wireless fashion in step S2 from the wheel unit to a receiver unit which can be mounted on the vehicle side. In step S3, the reference limb of the wheel is then determined on the basis of the transmitted data. For example, the wheel unit can transmit data essentially at the time at which the wheel 11*a* passes through the reference limb 29. The receiver unit 12 detects the time at which it receives these data and detects the state in which the measuring device 16*a* was in at this time, in order thereby to determine the initial position I. In other words, the device makes a note of which tooth was currently passing the Hall sensor of the measuring device 16*a* when the wheel unit 10*a* passed the reference limb 29.

Alternatively, the wheel unit can detect the time at which the wheel 11*a* passes through the reference limb and transmit the detected time within the scope of the data. The vehicle electronics 15 have access to a clock which is synchronized with a clock of the wheel unit 10*a*, and are capable of detecting, on the basis of the transmitted data, the state of the measuring device 16*a* at the transmitted time. In this way, the initial position I can also be detected.

In step S4 of the method shown in FIG. 7, the measuring device generates in each case a signal when the wheel rotates by a predetermined angle. The generated signals are counted in step S5. In step S6, an absolute angular position of the wheel is then detected on the basis of the generated signals and the determined reference limb. In step S7, it is checked whether the speed of the vehicle has changed from a value below a predetermined threshold value to a value above the threshold value. If this is the case, the system branches to step S1. Otherwise, no renewed synchronization is necessary and the system branches to step S4.

The explanations made with respect to the figures are to be understood in a purely illustrative and non-restrictive fashion. Many changes can be performed to the embodiments shown without departing from the scope of protection such as is defined in the appended claims.

LIST OF REFERENCE SYMBOLS

1 Rotational speed sensor according to the prior art
2 Gearwheel
3 a conceivable rotational direction
4 Tooth
5 Hall sensor
6 Magnet
7 first Hall element
8 second Hall element
9 Embodiment of a device according to the invention for determining an absolute angular position
10*a*-10*d* Wheel unit
11*a*-11*d* Wheel
12 Receiver unit
13 Line
14 Reference limb-determining device
15 Vehicle electronics
16*a*-16*d* Measuring device
17*a*-17*d* Line
18 Counting device
19 Angle-determining device
20 Pressure sensor
21 Evaluation unit
22 Acceleration sensor
23 Memory
24 Transmitter unit
25 Antenna
26 Battery
27 Rim
28 Tire
29 Reference limb
30 Limb
α Angle S1 Acquiring data which permit the reference limb of the wheel to be determined
S2 Transmitting the acquired data
S3 Determining the reference limb of the wheel on the basis of the transmitted data
S4 Generating in each case a signal when the wheel rotates by a predetermined angle
S5 Counting of the generated signals
S6 Determining an absolute angular position of the wheel
S7 Changing the speed of the vehicle from a value below a predetermined threshold value to a value above the threshold value?
t0-t4 Times
V1 25 km/h
V2 2 km/h
V3 −2 km/h
V4 −25 km/h

The invention claimed is:

1. A device for determining an absolute angular position of a wheel of a vehicle, comprising:
a wheel unit to be mounted on a wheel side, said wheel unit having a sensor configured to acquire data representing a rotational position of the wheel relative to the earth or to a road surface upon which the vehicle is traveling, and to generate therefrom a sensor signal permitting a reference limb of the wheel to be determined, the reference limb being an absolute angular position of the wheel relative to the vehicle, and said wheel unit further having a transmitter for transmitting the acquired data wirelessly;
a receiver unit to be mounted on the vehicle side for receiving the sensor signal from said wheel unit;
a reference limb-determining device configured for determining the reference limb of the wheel based on the sensor signal received by said receiver unit;
a measuring device for generating in each case a signal when the wheel rotates by a predetermined angle;
a counting device for counting the signals generated by said measuring device; and
an angle-determining device for determining an absolute angular position of the wheel based on the signals counted by said counting device and the determined reference limb.

2. The device according to claim 1, configured to receive or acquire data relating to a speed of the vehicle, and wherein said reference limb-determining device is configured to determine the reference limb of the wheel after the speed increases from a value below a predetermined threshold value to a value above the threshold value.

3. The device according to claim 1, wherein said sensor is an acceleration sensor and is configured to acquire the data on the basis of:
a force of gravity of the earth acting on said acceleration sensor;
an acceleration occurring when the acceleration sensor enters a footprint of the wheel; or
an acceleration occurring when the acceleration sensor exits the footprint of the wheel.

4. The device according to claim 1, wherein the wheel unit comprises a piezo-element and is configured to acquire the data on the basis of:
a change in bending of said piezo-element occurring when said piezo-element enters a footprint of the wheel; or
a change in the bending of said piezo-element occurring when said piezo-element exits the footprint of the wheel.

5. The device according to claim 1, wherein said wheel unit comprises a magnetic field sensor and is configured to acquire the data on the basis of a magnetic field of the earth acting on the magnetic field sensor.

6. The device according to claim 1, wherein said wheel unit comprises an evaluation unit configured to sample output signals of a sensor of the wheel unit in order to generate sampled signals and to analyze the sampled signals in order to detect a passage of the wheel through the reference limb.

7. The device according to claim 6, wherein the sensor of said wheel unit comprises an acceleration sensor.

8. The device according to claim 6, wherein said wheel unit is configured to transmit the data substantially at a time at which the wheel passes through the reference limb, or to acquire the time at which the wheel passes through the reference limb and to transmit the acquired time within the data.

9. The device according to claim 1, wherein said measuring device has a rotational element of an ABS sensor disposed to rotate synchronously with the wheel.

10. A method of determining an absolute angular position of a wheel of a vehicle, the method comprising:

a) acquiring data in form of a sensor signal that permits an initial angular position of the wheel relative to the vehicle to be determined, by way of a sensor of a wheel unit mounted on the wheel;
b) wirelessly transmitting the sensor signal thus acquired from a transmitter of the wheel unit to a receiver unit mounted on a vehicle side;
c) determining the angular position of the wheel relative to the vehicle on the basis of the sensor signal thus transmitted;
d) generating a signal in each case when the wheel rotates through a predetermined angle from the initial angular position;
e) counting the signals thus generated; and
f) determining an absolute angular position of the wheel on the basis of the generated signals thus counted and the determined initial angular position.

11. The method according to claim 10, which comprises carrying out steps a) to c) after a speed of the vehicle increases from a value below a predetermined threshold value to a value above the threshold value.

* * * * *